(12) United States Patent
Delshadpour

(10) Patent No.: US 11,165,610 B1
(45) Date of Patent: Nov. 2, 2021

(54) DE-EMPHASIS CONTROLLER FOR TRANSMIT DRIVER IN WIRELINE COMMUNICATION

(71) Applicant: NXP USA, Inc., Austin, TX (US)

(72) Inventor: Siamak Delshadpour, Phoenix, AZ (US)

(73) Assignee: NXP USA, Inc., Austin, TX (US)

(*) Notice: Subject to any disclaimer, the term of this patent is extended or adjusted under 35 U.S.C. 154(b) by 0 days.

(21) Appl. No.: 17/194,583

(22) Filed: Mar. 8, 2021

(51) Int. Cl.
*H04L 25/03* (2006.01)
*H04B 3/06* (2006.01)

(52) U.S. Cl.
CPC ......... *H04L 25/03885* (2013.01); *H04B 3/06* (2013.01)

(58) Field of Classification Search
CPC ............................ H04L 25/03885; H04B 3/06
See application file for complete search history.

(56) References Cited

U.S. PATENT DOCUMENTS

| | | | |
|---|---|---|---|
| 7,817,727 B2 * | 10/2010 | Kumar ................ | G06F 13/4086 375/258 |
| 8,497,707 B2 | 7/2013 | Liu et al. | |
| 8,964,826 B2 | 2/2015 | Agrawal et al. | |
| 2010/0237910 A1 * | 9/2010 | Mukhopadhyay .. | H03F 3/45085 327/108 |
| 2012/0262205 A1 * | 10/2012 | Nishi .................. | H04L 25/0286 327/108 |
| 2014/0266320 A1 * | 9/2014 | Conrow ......... | H03K 19/018592 327/108 |
| 2017/0126327 A1 * | 5/2017 | Keil ..................... | H04B 10/541 |

OTHER PUBLICATIONS

Younus Mohammed, et al. 8Gbps High-Speed I/O Transmitter with Scalable Speed, Swing and Equalization Levels; Downloaded Nov. 15, 2020 from IEEE Xplore; 4 pgs.
Wang Xiaoran, et al. A Hybrid Line Driver with Voltage-Mode SST Pre-Emphasis and Current-Mode Equalization; Downloaded Nov. 15, 2020 from IEEE Xplore; 4 pgs.
Delshadpour Siamak, et al. A 5.4 Gbps Protocol Based CMOS Limiting Re-Driver for Type-C Applications; Downloaded on Dec. 17, 2020 from IEEE Xplore; 4 pgs.
Pandey, Anil Kumar; Signal Integrity Journal; Ensuring High Signal Quality in PCIe Gen Channels; Mar. 15, 2017; 12 pgs.
Hopkins Jessica; What is Signal De-Emphasis and When is it Used? Oct. 20, 2020; 6 pgs.

* cited by examiner

*Primary Examiner* — Freshteh N Aghdam

(57) ABSTRACT

Various embodiments relate to a de-emphasis (DE) controller in a wireline transmitter, including: a digital decoder configured to receive a DE control value and configured to produce a bias control value, an N1 control value, and an N2 control value; a bias controller configured to vary the bias current for a de-emphasis circuit based upon the bias control value; an N1 controller configured to activate a number of N1 unit cells in a delayed line driver based upon the N1 control value; and an N2 controller configured to activate a number of N2 unit cells in a non-delayed line driver based upon the N2 control value, wherein the N1 control value plus the N2 control value varies for different DE control values, and wherein the bias control value is based upon the N1 control value plus the N2 control value.

12 Claims, 6 Drawing Sheets

DE-EMPHASIS CONTROLLER FOR TRANSMIT DRIVER IN WIRELINE COMMUNICATION

TECHNICAL FIELD

Various exemplary embodiments disclosed herein relate generally to a de-emphasis (DE) controller for transmit driver in wireline communication.

BACKGROUND

Signal de-emphasis is a signal-enhancing technique often used to improve the quality of electrical signals transmitting at gigabit rates over devices including PCBs and long cables. Signal degradation can be due to a variety of reasons, including long transmission lines and jitter, so this technique helps negate these issues by decreasing the low frequency data to minimize signal loss.

Signal loss within cables is a naturally occurring effect, particularly within cables using copper wires. This signal attenuation, or reduction in signal strength throughout the cable, can be due to a number of factors, including resistance or impedance in the wire, and can be especially prominent with higher frequency signals. The high-frequency loss is also greater with longer cables and can lead to loss of bit data.

Within a receiver there can be circuitry that performs automatic gain control. This automatic gain can compensate for some of the signal loss as it is designed to keep a constant output signal despite any variations within the signal at the input of the amplifier or system. In other words, it essentially "turns up the volume" to make a weak signal louder or reduces the amplification when it is too strong.

When the high-frequency loss is significantly different from the low-frequency loss, that gain will get set according to the stronger frequency and the weaker frequency will be unrecoverable. This poses a problem with outputting a quality signal.

There are a few techniques that are used to compensate for such signal degradation issues, including pre-emphasis and de-emphasis. Both pre- and de-emphasis occur on the transmitter side. Assuming loss in the cable, the transmitter will boost the high frequency content (pre-emphasis) or decrease the low frequency content (de-emphasis).

Pre-emphasis works by boosting the high-frequency portion of the signal. This compensates for the high-frequency loss in the cable.

De-emphasis works by cutting the low-frequency portion of the signal. This may be coupled with an increased transmit voltage.

Pre-emphasis and de-emphasis provide essentially the same function, which is to provide a flat frequency curve on the receiver side. In actual implementation, de-emphasis can be technically simpler, so it is more often seen between the two.

While pre/de-emphasis helps to create a more stable signal, it can also create issues if the system applies too much of either. For instance, if you surpass the optimal amount, you can end up with too little low-frequency and too much high-frequency.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a de-emphasis (DE) controller in a wireline transmitter, including: a digital decoder configured to receive a DE control value and configured to produce a bias control value, an N1 control value, and an N2 control value; a bias controller configured to vary the bias current for a de-emphasis circuit based upon the bias control value; an N1 controller configured to activate a number of N1 unit cells in a delayed line driver based upon the N1 control value; and an N2 controller configured to activate a number of N2 unit cells in a non-delayed line driver based upon the N2 control value, wherein the N1 control value plus the N2 control value vanes for different DE control values, and wherein the bias control value is based upon the N1 control value plus the N2 control value.

Various embodiments are described, wherein the digital decoder is configured to receive a swing value and configured to output the swing value to the N1 controller and the N2 controller, the N1 controller is configured to generate a drive current based upon the swing value, and the N2 controller is configured to generate a drive current based upon the swing value.

Various embodiments are described, wherein the wireline transmitter is one of a USB transmitter, HDMI transmitter, a DVI transmitter and any other transmitter implementing a standard which may use FFE.

Various embodiments are described, wherein the de-emphasis controller applies de-emphasis to a signal transmitted on the wireline when current based feed-forward emphasis is used.

Further various embodiments relate to a wireless transmitter, including: an emphasis delay circuit configured to receive an input signal and configured to produce a delayed input signal and non-delayed input signal; a first line driver including N1 unit cells, wherein the first line driver is configured to receive the delayed input signal and configured to output a weighted delayed signal based on a N1 number of activated unit cells; a second line driver including N2 unit cells, wherein the second line driver is configured to receive the non-delayed input signal and configured to output a weighted non-delayed signal based a N2 number of activated unit cells; an output configured to combine the weighted delayed signal and the weighted non-delayed signal; a bias current source; and de-emphasis (DE) controller, including: a digital decoder configured to receive a DE control value and configured to produce a bias control value, an N1 control value, and an N2 control value; a bias controller configured to vary the bias current produced by the bias current source based upon the bias control value; an N1 controller configured to activate a number of the N1 unit cells in the delayed line driver based upon the N1 control value; and an N2 controller configured to activate a number of the N2 unit cells in the non-delayed line driver based upon the N2 control value, wherein the N1 control value plus the N2 control value varies for different DE control values, and wherein the bias control value is based upon the N1 control value plus the N2 control value.

Various embodiments are described, wherein the digital decoder is configured to receive a swing value and configured to output the swing value to the N1 controller and the N2 controller, the N1 controller is configured to generate a drive current based upon the swing value, and the N2 controller is configured to generate a drive current based upon the swing value.

Various embodiments are described, wherein the wireline transmitter is one of a USB transmitter, HDMI transmitter, a DVI transmitter, and any other transmitter implementing a standard which may use FFE.

Various embodiments are described, wherein the de-emphasis controller applies de-emphasis to a signal transmitted on the wireline when current based feed-forward emphasis is used.

Further various embodiments relate to a method for programming a de-emphasis (DE) controller, including: receiving a plurality of control DE levels; calculating the achieved DE value of each of a N1 and N2 value pair, wherein N1 has a value ranging from zero to N1max and N2 has a value ranging from zero to N2max, wherein N1max is the number of unit cells in a delayed line driver and N2max is the number of unit cells in a non-delayed line driver; for each of plurality of control DE levels, searching the calculated achieved DE values to select the calculated achieved DE value closest to each of the plurality of control DE levels; generating a control table, wherein the control table includes for each control DE level an associated N1 value and N2 value based upon the selected calculated achieved DE value closest to the control DE level.

Various embodiments are described, wherein the table further includes a bias control value based base upon N1+N2 for each control DE level.

Various embodiments are described, further comprising loading the table into a DE controller.

Various embodiments are described, further comprising before generating a control table: calculating DE error for each of the plurality of control DE levels based upon its associated selected calculated achieved DE value; determining if any of the calculated DE errors exceeds an DE error threshold; when the DE error threshold is exceeded, increasing the values of N1max and N2max by a predetermine value; calculating the achieved DE value of each of the N1 and N2 value pairs, wherein N1 has a value ranging from zero to N1max and N2 has a value ranging from zero to N2max; and for each of plurality of control DE levels, searching the calculated achieved DE values to select the calculated achieved DE value closest to each of the plurality of control DE levels.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

De-emphasis is regularly used in high-speed systems, which are often classified as being 1 Gbps or more. Signal de-emphasis can be found commonly in HDMI and DisplayPort cables. HDMI cables are known to use signal de-emphasis the most aggressively, as they are frequently fabricated to be longer. Because SuperSpeed USB is a higher-speed interface than its USB 2.0 counterpart, it must consider transmission-line effects and use equalization to ensure there are fewer reductions in the signal integrity. Therefore, de-emphasis is also commonly used, but is used less compared to HDMI or DisplayPort.

Because cables naturally experience signal loss, de-emphasis is a helpful technique in preserving the integrity of the signal throughout the cable. De-emphasis does this by decreasing the low frequency portion of the signal, which in turn allows the receiver to output a stable signal.

Figure 1:
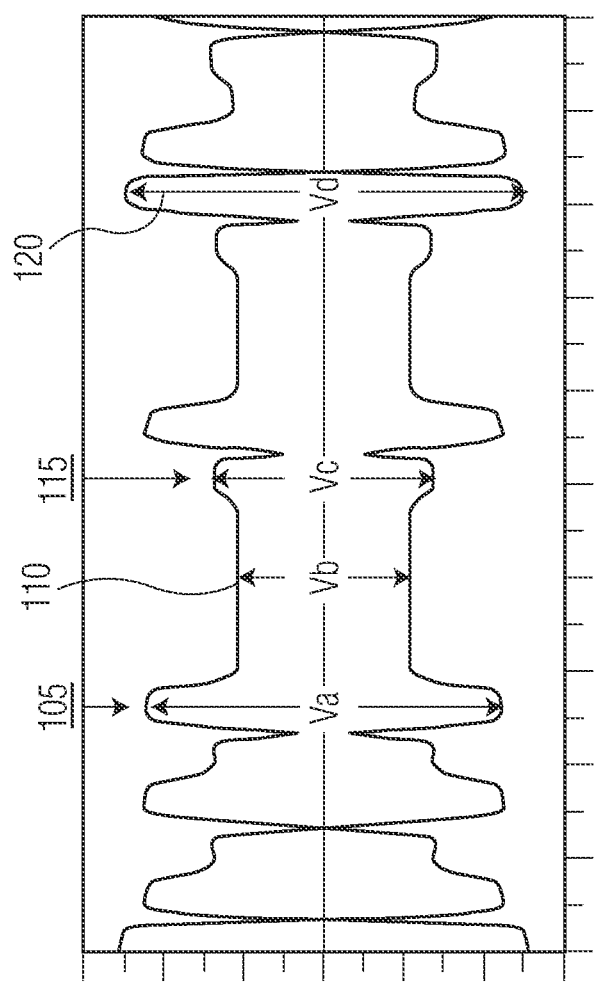
FIG. 1 shows the resultant output signal when a binary input stream is applied to a 3-tap FIR filter.

Transmit de-emphasis is used to compensate for high-frequency channel losses. FIG. 1 shows the resultant output signal when a binary input stream is applied to a 3-tap FIR filter. A de-emphasized waveform is defined in terms of the voltage levels Va (de-emphasis) 105 and Vb (flat level) 110. Note that the output takes a different value just before and after polarity inversion of the input bit stream. Corresponding to these events, the PCIe 3.0 specification defines new terminologies as explained in Table 1. Voltages Va 105, Vb 110, Vc 115, and Vd 120 correspond to de-emphasis, flat level, pre-shoot, and maximum boost events, respectively.

TABLE 1

Different equalization terminologies.

| Term | Corresponding Condition on Input signal |
| --- | --- |
| De-emphasis (Va) | A boost appears just after the polarity inversion |
| Flat Level (Vb) | A constant voltage will appear when bits of the same polarity are being transmitted |
| Pre-Shoot (Vc) | A boost appears just before the polarity inversion |
| Maximum Boost (Vd) | A major boost appears when there is polarity inversion only for one-bit interval |

Embodiments of a de-emphasis controller will be described that have the following benefits: reducing the number of needed cells to get different de-emphasis levels; providing a new simple scheme for current mode TX drivers with feed-forward equalizers (FFE); making swing programming much easier and in a modular form; providing a low complexity architecture which is good for an industrial level chip; introducing a methodic approach to reduce number of needed FFE cells. As a result, the de-emphasis controller significantly reduces the number of the needed cells to achieve a de-emphasis level and may be used with many existing wireline standards.

Figure 2:
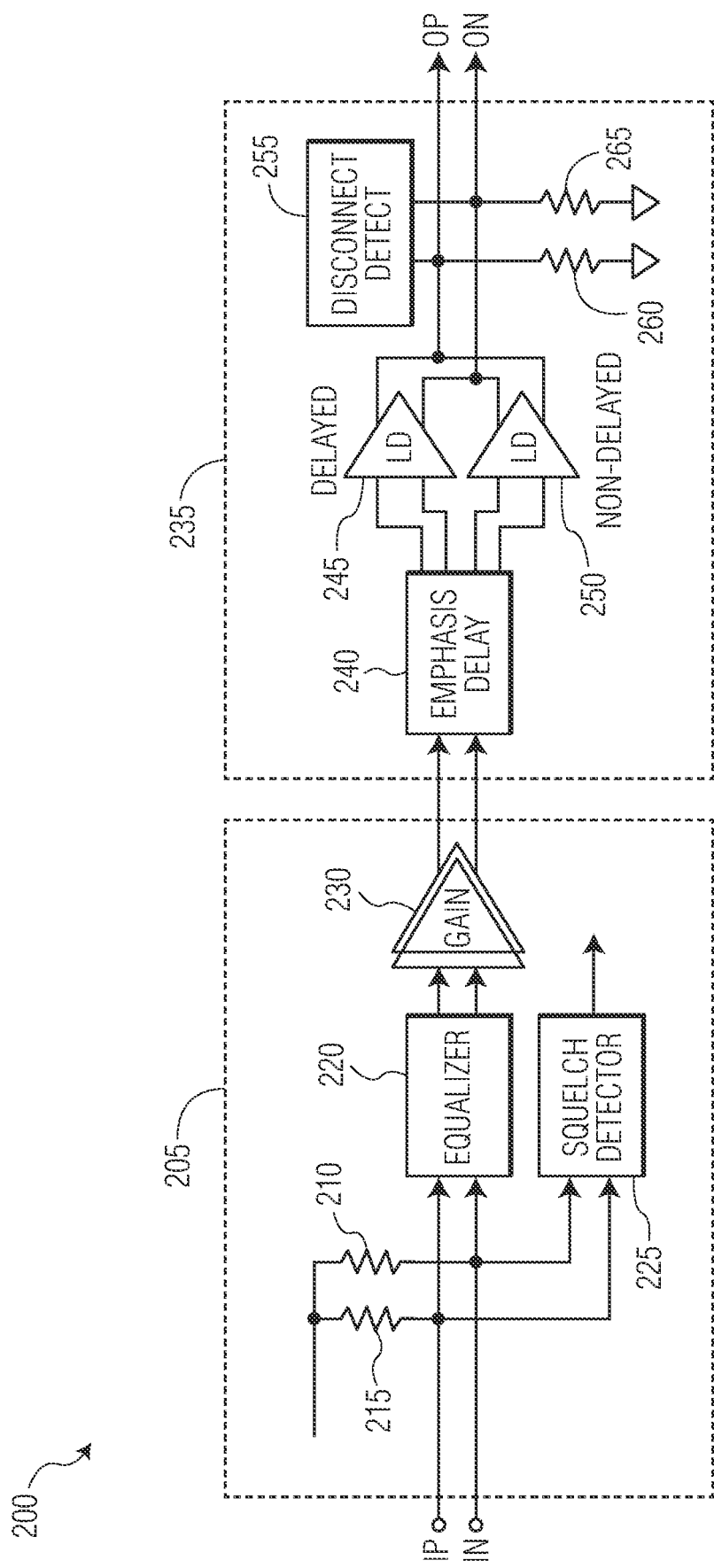
FIG. 2 illustrates a standard repeater/redriver architecture with a de-emphasis feature.

FIG. 2 illustrates a standard repeater/redriver architecture with a de-emphasis feature. The repeater/redriver 200 includes a receiver 205 and a transmitter 235. The receiver includes dual inputs IP (input positive) and IN (input negative). The inputs IP and IN may be connected to termination resistors 215 and 210 respectively. An optional squelch detector 225 may be connected to the inputs as well to produce a squelch signal in certain applications. An equalizer 220 may receive the inputs IP and IN and provide an equalized output to gain stages 230 that act as a slicer. The equalizer 220 may be a continuous time linear equalizer (CTLE).

The receiver 235 includes an emphasis delay 240, line drivers 245, 250, a disconnect detector 225, and termination resistors 260, 265. The emphasis delay 240 helps to make an FFE. The emphasis delay 240 produces two outputs: a delayed version of the input signal; and a non-delayed version of the input signal. The delayed signal is fed into a line driver 245. The non-delayed signal is fed into a line driver 250. The outputs of the line drivers 245, 250 are combined to produce output signals OP (output positive) and ON (output negative). The output and input termination resistor values may be selected based upon the specific application.

The equalizer 220 removes most of the inter-symbol interference (ISI) that is introduced by the transmission channel at its input. The gain stages 230 that (may) act as a slicer make a non-linear hard decision and sets the equalized signal to either high or low. This avoids propagation of amplitude noise and allows regeneration of pre-emphasis, but turns residual ISI into non-equalizable timing jitter.

The transmitter 235 uses the emphasis delay cells of 240 and line drivers 245, 250 to (pre/de) emphasis the transmitted signal. The output signal of the transmitter 235 is a weighted sum of the input signal and the signal delayed by one unit interval (UI). The delayed signal is used to compensate the post-cursor ISI. The weight of the delayed signal decides the equalizer gain of the transmitter 235, and its optimum value varies with different applications. The shown conceptual picture is for one UI, but the delay may be a different value instead of one (e.g., 0.25 UI, 0.5 UI, 0.75 UI a fixed or programmable value) depending on the application and system requirement.

Figure 3:
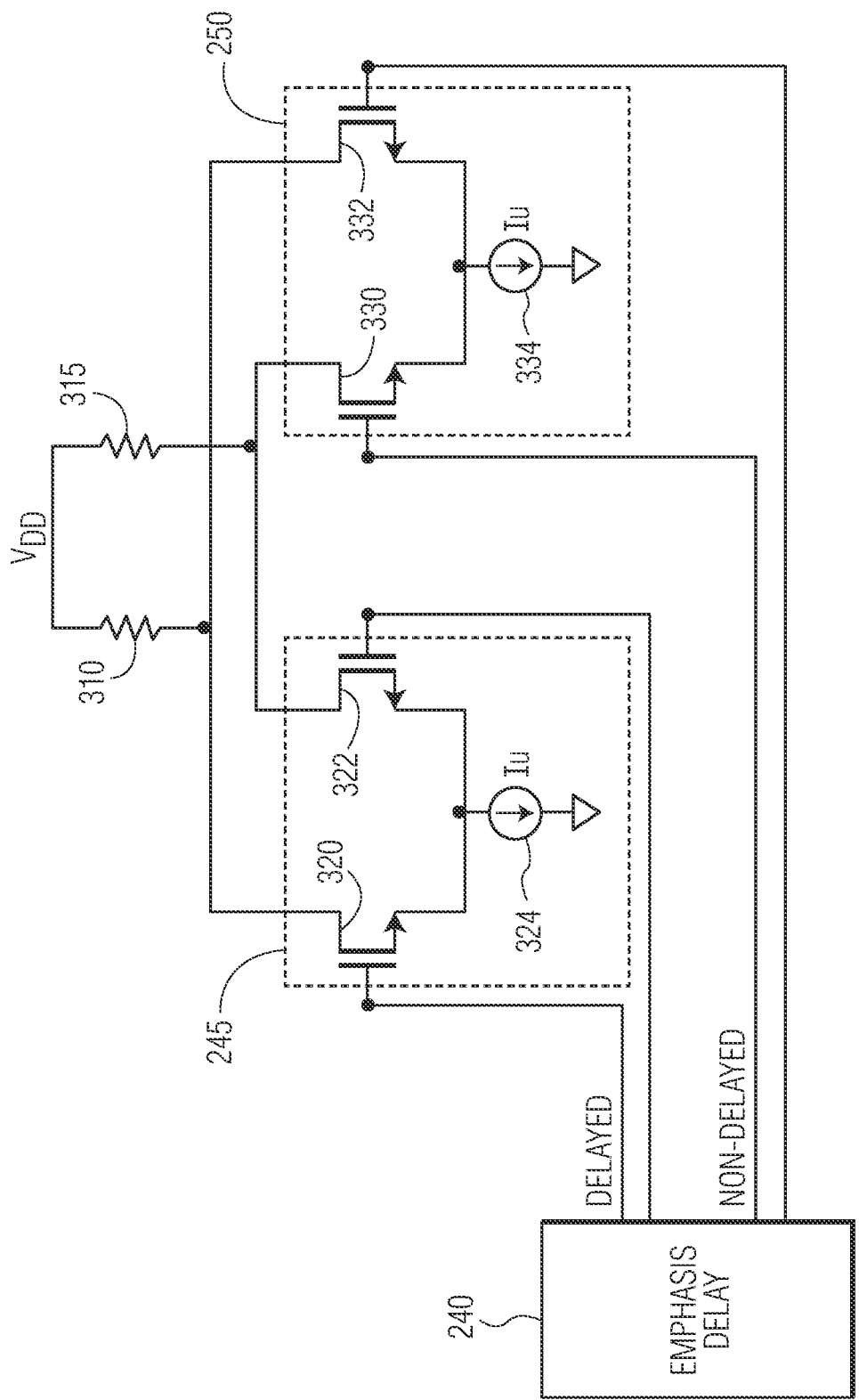
FIG. 3 illustrates the current-mode transmitter architecture in more detail.
Figure 5:
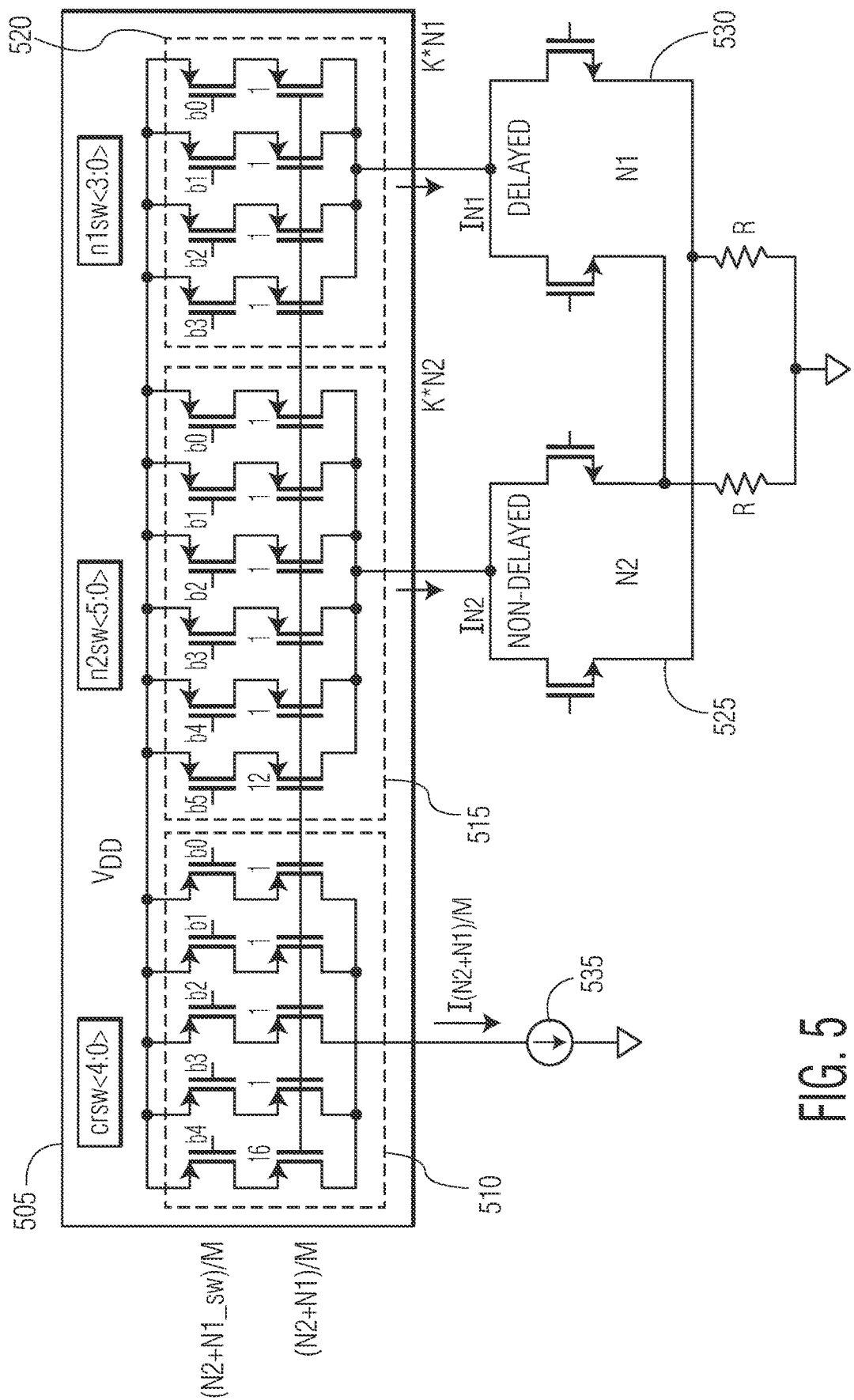
FIG. 5 illustrates a DE controller that adjusts for the variation in N1+N2 (de-emphasis levels)

FIG. 3 illustrates the (current mode) transmitter architecture in more detail. The delayed line driver 245 includes N1 unit cells. Each of the unit cells includes transistors 320 and 322 and current source 324. The transistor 320 is connected between the resistor 310 and the current source 324. The transistor 322 is connected between the resistor 315 and the current source 324. The non-delayed line driver 250 includes N2 unit cells. Each of the unit cells includes transistors 330 and 332 and current source 334. The transistor 330 is connected between the resistor 315 and the current source 334. The transistor 332 is connected between the resistor 310 and the current source 334. The weight of either the non-delayed signal or the delayed signal paths is controlled by the numbers of active unit cells in each path. The unit cells of FIG. 3 use NMOS transistors, but a PMOS transistor based may be used as well (which in that case, resistors of 310 and 315 will be terminated to ground similar to what is shown in FIG. 5).

Considering Iu as a tail current of each of the unit cell, each unit cell may cause a voltage swing level of $Iu*R_T$ (where $R_T$ is the termination resistor, 310 and 315). N2 is number of non-delayed cells and N1 is number of delayed cells. The peak to peak amplitude of the output may be written as:

$$(N2+N1)*R_T*Iu. \qquad (1)$$

The de-emphasized amplitude of the output can be written as:

$$(N2-N1)*R_T*Iu. \qquad (2)$$

The de-emphasis value in dB will be:

$$20 \log((N2+N1)/(N2-N1)). \qquad (3)$$

An embodiment of a de-emphasis controller will now be described. In this example, seven de-emphasis levels are required: 0 dB, 1 dB, 2 dB, 3 dB, 4 dB, 5 dB, and 6 dB (note that 0 dB practically is not a de-emphasis and is used to provide consistency in discussion). The de-emphasis control may be extended to any other number of DE levels and steps.

Now a method of selecting the N2 and N1 values to provide accurate DE levels will now be described. Itotal, the total current, may be a multiple of Iu which was used in equations 1-2.

Defining:

$$(N2+N1)*R_T*Iu=V_{swing} \qquad (4)$$

$$(N2+N1)*V_{unit}=V_{swing} \qquad (5)$$

$$DE=20 \log((N2+N1)/(N2-N1)) \qquad (6)$$

From formula (6), the following may be derived:

$$(N2+N1)/(N2-N1)=10^{(DE/20)} \qquad (7)$$

$$N2+N1=V_{swing}/V_{unit} \qquad (8)$$

$$N2-N1=V_{swing}/V_{unit}*10^{(DE/20)} \qquad (9)$$

Then:

$$N2=0.5*(V_{swing}/V_{unit})(1+10^{(DE/20)}) \qquad (10)$$

$$N1=0.5*(V_{swing}/V_{unit})(1-10^{(DE/20)}) \qquad (11)$$

and to make then an integer value:

$$N2=\text{round}(0.5*(V_{unit}/V_{unit})(1+10^{(DE/20)})) \qquad (12)$$

$$N1=\text{round}(0.5*(V_{swing}/V_{unit})(1-10^{(DE/20)})) \qquad (13)$$

And still N1+N2 is constant and is equal to the original value. DE will be calculated then again using formula (6) using N1 and N2 calculated from equations (12) and (13). The rounding causes an error from the required value.

In order to make the Swing a fixed value, N1+N2 will need to be constant for all of the required DE levels.

To further explain the operation of the DE controller, a real case for USB2 CM driver may be used. In this case DE levels of 0 dB, 1 dB, 2 dB, 3 dB, 4 dB, 5 dB, and 6 dB are specified. Further, swing levels of 350 mV to 700 mV in 50 mV steps are specified. Keeping these requirements independent and easy to design is a challenge.

In a traditional method of selecting N1 and N2, a larger N1+N2 means more unit cells are needed. More unit cells means that more granularity of DE values are possible and leads to the ability to better achieve the desired DE levels. A larger number of unit cells leads to increased complexity, increase circuit size, and a larger digital decoder needed to implement the DE controller.

Table 2 shows the calculations for DE for N2+N1=10, 15, 20, 35, 30, 35, 40, 80, 100, 150, and 200.

TABLE 2

Calculation for N2 + N1 = 10, 15, 20, 35, 30, 35, 40, 80, 100, 150, and 200.

| N1 + N2 Required DE [dB] | 10 | | 15 | | 20 | | 25 | | 30 | | 35 | |
|---|---|---|---|---|---|---|---|---|---|---|---|---|
| | N2 | N1 | N2 | N1 | N2 | N1 | N2 | N1 | N2 | N1 | N2 | N1 |
| 0 | 10 | 0 | 15 | 0 | 20 | 0 | 25 | 0 | 30 | 0 | 35 | 0 |
| 1 | 9.456 | 0.544 | 14.134 | 0.810 | 18.913 | 1.087 | 23.641 | 1.359 | 28.369 | 1.631 | 33.087 | 1.903 |
| 2 | 8.972 | 1.028 | 13.457 | 1.543 | 17.943 | 2.057 | 22.429 | 2.571 | 25.915 | 3.085 | 31.401 | 3.599 |
| 3 | 8.540 | 1.460 | 12.810 | 2.190 | 17.079 | 2.321 | 21.243 | 3.851 | 25.619 | 4.381 | 23.889 | 5.111 |
| 4 | 8.155 | 1.845 | 12.232 | 2.768 | 16.310 | 3.690 | 20.387 | 4.613 | 24.464 | 5.536 | 28.542 | 6.458 |
| 5 | 7.812 | 2.188 | 11.718 | 3.282 | 15.623 | 4.377 | 19.523 | 5.471 | 23.435 | 6.565 | 27.341 | 7.659 |
| 6 | 7.506 | 2.494 | 11.259 | 3.741 | 15.012 | 4.388 | 18.765 | 6.235 | 22.518 | 7.482 | 26.271 | 8.729 |

| Required DE [dB] | Rounded N2, N1 | | | | | | | | | | | |
|---|---|---|---|---|---|---|---|---|---|---|---|---|
| | N2 | N1 | N2 | N1 | N2 | N1 | N2 | N1 | N2 | N1 | N2 | N1 |
| 0 | 10 | 0 | 15 | 0 | 20 | 0 | 25 | 0 | 30 | 0 | 35 | 0 |
| 1 | 9 | 1 | 11 | 1 | 19 | 1 | 24 | 1 | 28 | 2 | 33 | 2 |
| 2 | 9 | 1 | 13 | 2 | 18 | 2 | 22 | 3 | 27 | 3 | 31 | 4 |
| 3 | 9 | 1 | 13 | 2 | 17 | 3 | 21 | 4 | 26 | 4 | 30 | 5 |
| 4 | 8 | 2 | 12 | 3 | 16 | 4 | 20 | 5 | 24 | 6 | 29 | 6 |
| 5 | 8 | 2 | 12 | 3 | 16 | 4 | 20 | 5 | 23 | 7 | 27 | 8 |
| 6 | 8 | 2 | 11 | 4 | 15 | 5 | 19 | 6 | 23 | 7 | 26 | 9 |

| Required DE [dB] | DE | DE-error | DE | DE-error | DE | DE-error | DE | DE-error | DE | DE-error | DE | DE-error |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1.938 | −0.938 | 1.243 | −0.243 | 0.915 | 0.085 | 0.724 | 0.276 | 1.243 | −0.243 | 1.054 | −0.054 |
| 2 | 1.938 | 0.062 | 2.694 | −0.694 | 1.938 | 0.062 | 2.384 | −0.384 | 1.938 | 0.062 | 2.254 | 0.254 |
| 3 | 1.938 | 1.062 | 2.634 | 0.306 | 3.098 | −0.038 | 3.350 | −0.350 | 2.634 | 0.206 | 2.923 | 0.077 |
| 4 | 4.437 | −0.437 | 4.437 | −0.437 | 4.437 | −0.437 | 4.437 | −0.437 | 4.437 | −0.437 | 3.647 | 0.353 |
| 5 | 4.437 | 0.363 | 4.437 | 0.563 | 4.437 | 0.563 | 4.437 | 0.563 | 5.460 | −0.460 | 5.306 | −0.305 |
| 6 | 4.437 | 1.563 | 6.620 | −0.620 | 6.021 | −0.021 | 5.680 | 0.320 | 5.460 | 0.540 | 6.272 | −0.272 |

| N1 + N2 Required DE [dB] | 40 | | 80 | | 100 | | 150 | | 200 | |
|---|---|---|---|---|---|---|---|---|---|---|
| | N2 | N1 | N2 | N1 | N2 | N1 | N2 | N1 | N2 | N1 |
| 0 | 40 | 0 | 80 | 0 | 100 | 0 | 150 | 0 | 200 | 0 |
| 1 | 37.825 | 2.175 | 75.650 | 4.350 | 94.563 | 5.437 | 141.344 | 8.156 | 189.125 | 10.875 |
| 2 | 35.887 | 4.113 | 71.773 | 8.227 | 89.716 | 10.284 | 134.575 | 15.425 | 179.433 | 20.567 |
| 3 | 34.159 | 5.841 | 68.318 | 11.682 | 85.337 | 14.603 | 123.036 | 21.904 | 170.795 | 29.205 |
| 4 | 32.619 | 7.381 | 65.238 | 14.762 | 81.548 | 18.452 | 122.322 | 27.678 | 163.096 | 36.904 |
| 5 | 31.247 | 8.753 | 62.194 | 17.506 | 78.117 | 21.883 | 117.176 | 32.824 | 156.234 | 43.765 |
| 6 | 30.024 | 9.976 | 60.047 | 19.953 | 75.053 | 24.941 | 112.589 | 37.411 | 150.119 | 49.881 |

| Required DE [dB] | Rounded N2, N1 | | | | | | | | | |
|---|---|---|---|---|---|---|---|---|---|---|
| | N2 | N1 | N2 | N1 | N2 | N1 | N2 | N1 | N2 | N1 |
| 0 | 40 | 0 | 80 | 0 | 100 | 0 | 150 | 0 | 200 | 0 |
| 1 | 38 | 2 | 76 | 4 | 95 | 5 | 142 | 8 | 189 | 11 |
| 2 | 36 | 4 | 72 | 8 | 90 | 10 | 135 | 15 | 179 | 21 |
| 3 | 34 | 6 | 68 | 12 | 85 | 15 | 128 | 22 | 171 | 29 |
| 4 | 33 | 7 | 65 | 15 | 82 | 13 | 122 | 28 | 163 | 37 |
| 5 | 31 | 9 | 62 | 18 | 78 | 22 | 117 | 33 | 156 | 44 |
| 6 | 30 | 10 | 60 | 20 | 75 | 25 | 113 | 37 | 150 | 50 |

| Required DE [dB] | DE | DE-error | DE | DE-error | DE | DE-error | DE | DE-error | DE | DE-error |
|---|---|---|---|---|---|---|---|---|---|---|
| 0 | 0 | 0 | 0 | 0 | 0 | 0 | 0 | 0 | 0 | 0 |
| 1 | 0.915 | 0.085 | 0.915 | 0.085 | 0.915 | 0.085 | 0.980 | 0.020 | 1.012 | −0.012 |
| 2 | 1.938 | 0.062 | 1.938 | 0.062 | 1.938 | 0.062 | 1.938 | 0.062 | 2.047 | −0.047 |
| 3 | 3.098 | −0.098 | 3.098 | −0.098 | 3.098 | −0.098 | 3.016 | −0.015 | 2.975 | 0.025 |
| 4 | 3.742 | 0.258 | 4.082 | −0.082 | 3.876 | 0.124 | 4.053 | −0.059 | 4.013 | −0.013 |

TABLE 2-continued

Calculation for N2 + N1 = 10, 15, 20, 35, 30, 35, 40, 80, 100, 150, and 200.

| 5 | 5.193 | −0.193 | 5.193 | −0.193 | 5.036 | −0.036 | 5.036 | −0.036 | 5.036 | −0.036 |
| 6 | 6.021 | −0.021 | 6.021 | −0.021 | 6.021 | −0.021 | 5.306 | 0.094 | 6.021 | −0.021 |

Figure 4:
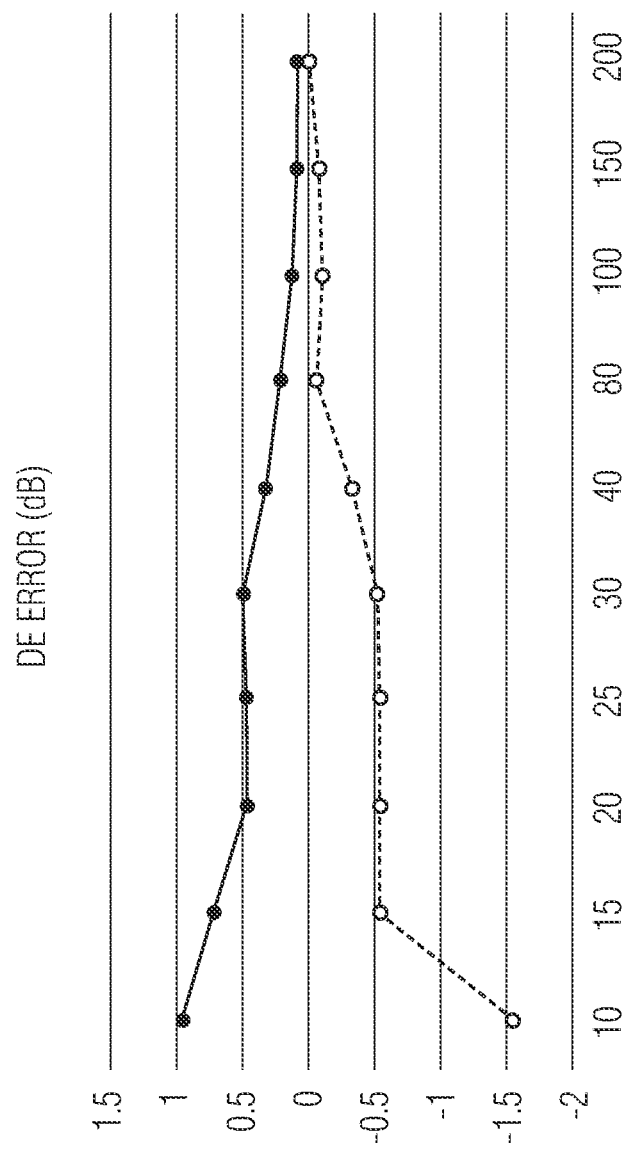
FIG. 4 shows the achieved min/max DE error from the required levels (0, 1, 2, 3, 4, 5, 6 dB) for N2+N1-10, 15, 20, 35, 30, 35, 40, 80, 100, 150, 200.

The top table of Table 2 shows the values for N1 and N2 based upon equations (10) and (11) for the various DE and N1+N2 values. The middle table of Table 2 shows the rounded values for N1 and N2 based upon equations (12) and (13). The bottom table then shows the achieved DE values based upon the rounded N1 and N2 values and the resulting DE error. Table 2 shows that higher N1+N2 results in lower error. FIG. 4 shows the achieved min/max DE error (along the y-axis) from the specified levels (0, 1, 2, 3, 4, 5, 6 dB) for N2+N1=10, 15, 20, 35, 30, 35, 40, 80, 100, 150, 200 (along the x-axis). As can be seen in FIG. 4, to achieve an accuracy of 0.1 dB, N1+N2=150 is required (N2150 and N137 referring to numbers of Table 2). This means that 150 N2 cells and 37 N1 cells are required to get ~ 0.1 dB DE accuracy. 150 N2 cells need 150 control lines and 37 N1 cells need 37 control lines. These control lines are outputs of the 3-bit DE select decoder. The output of decoder should control 150 N2 cells and 37 N1 cells for up to 2³=8 input choices. This approach not only needs too many unit cells, but also needs a large decoder as well, which leads to greatly increased complexity of the transmitter. Further, adding eight levels of swing to the above requirements, makes the complexity even higher. Further, a large N1+N2 value means that greater variability in various aspects and parameters of the unit cells will result and effect the performance.

Now solution to lower the required N1+N2 and to achieve an accuracy of ~0.1 dB will be described. Table 3 illustrates the DE values achieved using a DE controller that uses N217 and N1<4. This will result in much lower values for N1+N2 and result in less complexity. Table 3 shows the values of DE obtained for all different combinations of N1 for values of 0 to 4 and N2 for values of 0 to 17. The DE values in the table that the come the closest to the desired DE levels of 0, 1, 2, 3, 4, 5, and 6 dB are shown as underlined and in italic font. All of the values are within ~0.11 dB of the desired values. The use of 17 cells and 4 cells results in a much smaller total number of cells needed to implement the DE control.

TABLE 3

DE values achieved using a DE controller that uses N2 ≤ 17 and N1 ≤ 4

| N2 | N1 | N1 | N1 | N1 | N1 |
|---|---|---|---|---|---|
|  | 0 | 1 | 2 | 3 | 4 |
| 0 |  |  |  |  |  |
| 1 | 0 |  |  |  |  |
| 2 | 0 | 9.54 |  |  |  |
| 3 | 0 | 6.02 | 13.98 |  |  |
| 4 | 0 | 4.44 | 9.54 | 16.90 |  |
| 5 | 0 | 3.52 | 7.36 | 12.04 | 19.08 |
| 6 | 0 | 2.92 | 6.02 | 9.54 | 13.98 |
| 7 | 0 | 2.50 | 5.11 | 7.96 | 11.29 |
| 8 | 0 | 2.18 | 4.44 | 6.85 | 9.54 |
| 9 | 0 | 1.94 | 3.93 | 6.02 | 8.30 |
| 10 | 0 | 1.74 | 3.52 | 5.38 | 7.36 |
| 11 | 0 | 1.58 | 3.19 | 4.86 | 6.62 |
| 12 | 0 | 1.45 | 2.92 | 4.44 | _6.02_ |
| 13 | 0 | 1.34 | 2.69 | _4.08_ | _5.52_ |
| 14 | 0 | 1.24 | 2.50 | 3.78 | 5.11 |
| 15 | 0 | 1.16 | 2.33 | 3.52 | 4.75 |
| 16 | 0 | 1.09 | 2.18 | 3.30 | 4.44 |
| 17 | _0_ | _1.02_ | _2.05_ | _3.10_ | 4.17 |

Table 3 illustrates that N2 values of 12, 13, 14, and 17 along with N1 values of 0 to 4 may be used to implement a DE values of 0, 1, 2, 3, 4, 5, 6 dB. Table 4 illustrates the N2 and N1 values to be used for each DE level as well as the achieved DE level, N2+N1 value, and the N2−N1 value.

TABLE 4

| DE-Required (dB) | DE-Achieved (dB) | N2 | N1 | (N2 + N1) | (N2 − N1) |
|---|---|---|---|---|---|
| 0 | 0.000 | 17 | 0 | 17 | 17 |
| 1 | 1.023 | 17 | 1 | 18 | 16 |
| 2 | 2.053 | 17 | 2 | 19 | 15 |
| 3 | 3.098 | 17 | 3 | 20 | 14 |
| 4 | 4.082 | 13 | 3 | 16 | 10 |
| 5 | 5.105 | 14 | 4 | 18 | 10 |
| 6 | 6.021 | 12 | 4 | 16 | 8 |

Although the required DE is achieved with a much smaller number of the required unit cells, it is noted that N1+N2 is not constant as needed, and N1+N2 varies from 16 to 20, practically 18±1 and 18±2. This causes a systematic output swing variation of ±1/18=±5.55% and ±2/18=±11.11% which is not desired.

FIG. 5 illustrates a DE controller that adjusts for the variation in N1+N2 (de-emphasis levels). In FIG. 5, the systematic N1+N2 change may be adjusted by scaling the current mirror transistors on the left side using a bias controller 510, which affects the applied bias current. The applied bias current becomes a programmable about a base value ±5.55% and ±11.11% to compensate for the systematic change in N1+N2. However the easier and more efficient method will be making a simple weighted bias scheme to adjust the N2 and N1 and bias cells. The bias controller may receive a 5-bit input "crsw" that turns on different parts of the bias controller. The first bit has a current weight of 16 and the other bits have a current weight of 1. This allows for current weight values from 16 to 20 to be generated. An N2 controller 525 a control signal that is based on a 6-bit input n2sw. The first bit as a weight of 12 and each additional bit has a weight of 1, allowing for a range of values from 12 to 17 to drive N2 cells as needed. Likewise, an N1 controller 520 is controlled by a 4 bit controller that allows for values of 0 to 4.

TABLE 5

| eq_sel < 2:0) | crsw < 4:0> | n2sw<5:0> | n1sw <3:0> |
|---|---|---|---|
| 0 | 1-0001 | 1-11111 | 0000 |
| 1 | 1-0011 | 1-11111 | 0001 |

TABLE 5-continued

| eq_sel < 2:0> | crsw < 4:0> | n2sw<5:0> | n1sw <3:0> |
|---|---|---|---|
| 2 | 1-0111 | 1-11111 | 0011 |
| 3 | 1-1111 | 1-11111 | 0111 |
| 4 | 1-0000 | 1-00001 | 0111 |
| 5 | 1-0011 | 1-00011 | 1111 |
| 6 | 1-0000 | 1-00000 | 1111 |
| 7 | 0-0000 | 0-00000 | 0000 |

Table 5 illustrates the binary control values for "crsw" (bias current), "n2sw" (N2 value), and "n1sw" (N1 value).

The implemented scheme makes the swing programmability indicated by "K" independent from DE programmability in an organized and simple way.

Figure 6:
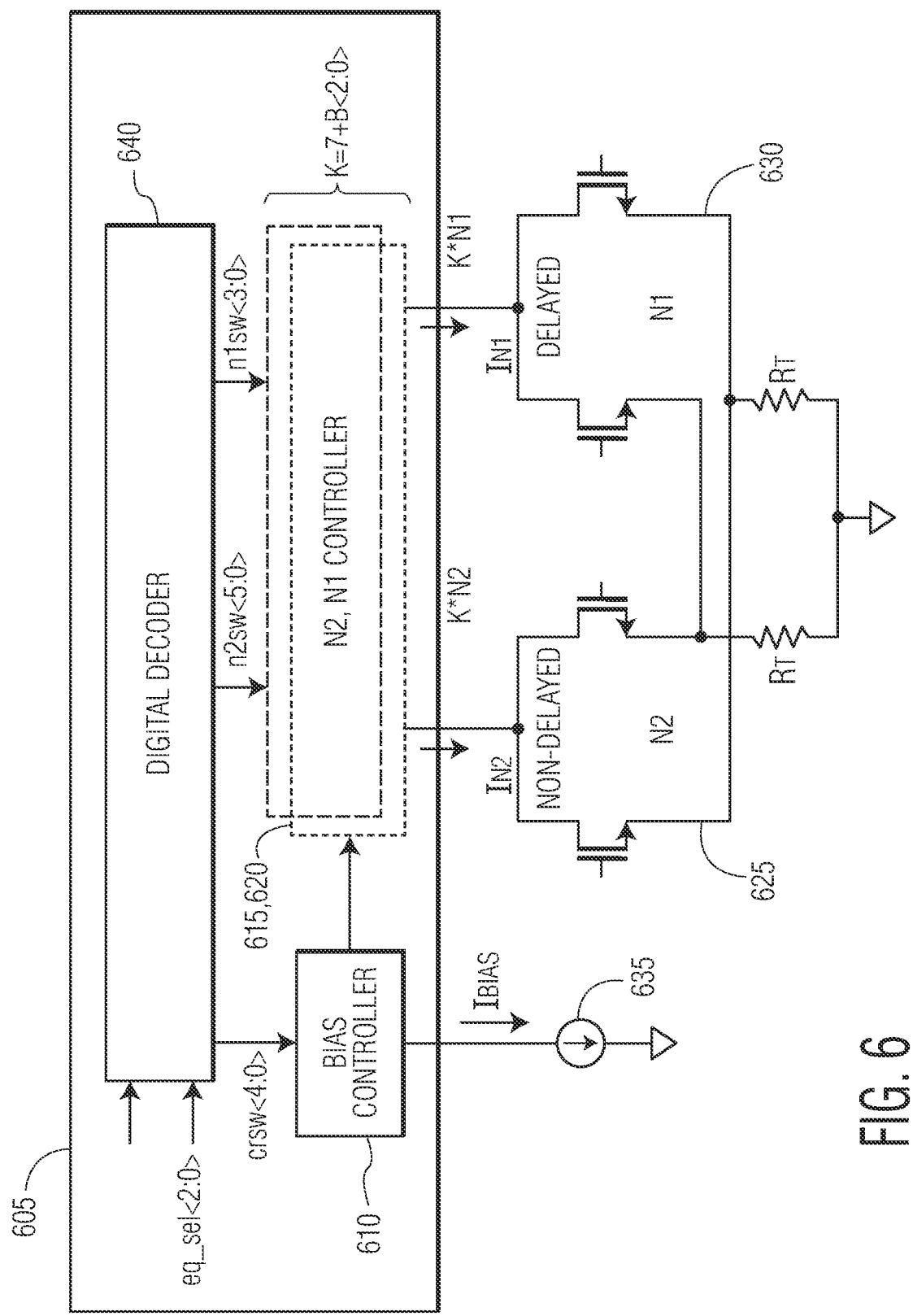
FIG. 6 illustrates a block diagram of the DE controller that includes swing compensation/control.

FIG. 6 illustrates a block diagram of the DE controller that includes swing compensation/control. The transmitter includes a DE controller 605, bias current source 635, N2 non-delayed unit cells 625, and N1 delayed unit cells 630. The bias controller 610 receives an input control "crsw" to control the value of the bias current. As is shown in FIG. 6, "K" is the multiplication factor for the N1 and N2 modules that allows for different swing values. Assuming the required swing of 350 mV to 700 mV with steps of 50 mV, if K is the unit number for N1 and N2 modules, then:

$$K*(N2+N1)*V\text{unit}=350 \text{ mV}$$

$$2K*(N2+N1)*V\text{unit}=700 \text{ mV}$$

Each step provides 50 mV of swing, so for Vunit=50 mV, if K=7, then Vswing=7*50 mV=350 mV and if K=2*7=14, then Vswing=2*7*50 mV=700 mV. As a result: K=7+(b2b1b0)=7+(b2*2²*b1*2¹+b0*2) which allows for a range of 7 to 14 covering the 350 mV to 700 mV range for swing voltage. Hence a three bit value may be used to set the K value and hence the swing value for the transmitter. In FIG. 6, the "K" value or swing value may be used to further control the N1 controller 620 or the N2 controller 625.

The digital decoder 640 may receive "eq_sel" as an input indicated the value of the DE level to be used. Further, the digital decoder 640 may receive a K or amplitude value indicative of the swing value to be used.

While specific values were illustrated in the example embodiment above, various values for N1, N2, K, and DE levels may be used.

A designer of a DE controller may take the following steps to design and program a DE controller. The following method for determining the maximum values of N1 and N2 and the specific N1 and N2 values to achieve a specific DE level may be implemented in a software based tool that receives inputs to then generate the data and tables needed to program a DE controller. First the desired DE levels are determined. Then the tool selects a maximum number of N1 cells and a maximum number of N2 cells. Then the tool uses equation (6) to calculate the DE achieved for each pair of N1 and N2 values. The tool then searches the calculated DE values and selects the closest DE value to each of the desired DE levels. Then the tool determines if the error between the selected DE values and the corresponding desired levels are less than a desired error threshold. If so, then the selected values may be used to program the DE controller. If not, the values for N1 and N2 may be increased, and the process repeated until N1 and N2 values are selected for each of the desired DE levels that meet the error threshold.

Another method for determining the N1 and N2 values may include the following steps. First the tool calculates a table of DE values for a large number of N1 and N2 values. The N1 and N2 values may be limited by an upper limit on the total number of cells that may be acceptable for a specific application. Then a maximum DE error may be specified and input into the tool. Next, for a given desired DE level, the tool searches the calculated DE values, and those calculated DE values that result in a DE error less than the DE error threshold are selected and placed in a list. Then the tool initially assigns the selected value in the list that results in the lowest N1+N2 value to that DE level. This process is then repeated for each of the desired DE levels resulting in an initially assigned DE value for each of the DE levels. Then the tool selects the maximum N1 value found among the N1 values associated with the initially assigned DE values. Likewise, the tool selects the maximum N2 value found among the N2 values associated with the initially assigned DE values. These maximum N1 and N2 values N1max and N2max become the N1 and N2 values used in the line drivers. Then, for each of the desired DE levels, the tool searches the list of selected DE values again to find the DE value such that N1 N1max, N2 N2max, and having the minimum DE error. This is done, because for any given DE value, the initially assigned DE value may not result in the lowest DE error that meets the N1max and the N2max value, as the initially assigned DE values are selected to minimize N1+N2. As the N1max and N2max values may be larger than N1 and N2 values that minimized N1+N2 during the initial search, there may be N1 and N2 values with in the N1max and N2max limits that result in a lower DE error, and these values are selected. The tool may then generate tables and other data to be programed in the DE controller.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in anyway limit the invention, which is defined only by the claims.

What is claimed is:

1. A de-emphasis (DE) controller in a wireline transmitter, comprising:
   a digital decoder configured to receive a DE control value and configured to produce a bias control value, an N1 control value, and an N2 control value;
   a bias controller configured to vary a bias current for a de-emphasis circuit based upon the bias control value;
   an N1 controller configured to activate a number of N1 unit cells in a delayed line driver based upon the N1 control value; and
   an N2 controller configured to activate a number of N2 unit cells in a non-delayed line driver based upon the N2 control value,
   wherein the N1 control value plus the N2 control value varies for different DE control values, and
   wherein the bias control value is based upon the N1 control value plus the N2 control value.

2. The de-emphasis controller of claim 1, wherein
   the digital decoder is configured to receive a swing value and configured to output the swing value to the N1 controller and the N2 controller, the N1 controller is configured to generate a drive current based upon the swing value, and the N2 controller is configured to generate a drive current based upon the swing value.

3. The de-emphasis controller of claim 1,
wherein the wireline transmitter is one of a Universal Serial Bus (USB) transmitter, High-Definition Multimedia Interface (HDMI) transmitter, a Digital Visual Interface (DVI) transmitter and any other transmitter implementing a standard which may use FFE (feed forward equalization).

4. The de-emphasis controller of claim 1, wherein
the de-emphasis controller applies de-emphasis to a signal transmitted on the wireline when current based feed-forward emphasis is used.

5. A wireline transmitter, comprising:
an emphasis delay circuit configured to receive an input signal and configured to produce a delayed input signal and non-delayed input signal;
a first line driver including N1 unit cells, wherein the first line driver is configured to receive the delayed input signal and configured to output a weighted delayed signal based on a N1 number of activated unit cells;
a second line driver including N2 unit cells, wherein the second line driver is configured to receive the non-delayed input signal and configured to output a weighted non-delayed signal based a N2 number of activated unit cells;
an output configured to combine the weighted delayed signal and the weighted non-delayed signal;
a bias current source; and
de-emphasis (DE) controller, comprising:
a digital decoder configured to receive a DE control value and configured to produce a bias control value, an N1 control value, and an N2 control value;
a bias controller configured to vary a bias current produced by the bias current source based upon the bias control value;
an N1 controller configured to activate a number of the N1 unit cells in the delayed line driver based upon the N1 control value; and
an N2 controller configured to activate a number of the N2 unit cells in the non-delayed line driver based upon the N2 control value,
wherein the N1 control value plus the N2 control value varies for different DE control values, and
wherein the bias control value is based upon the N1 control value plus the N2 control value.

6. The wireline transmitter of claim 5, wherein
the digital decoder is configured to receive a swing value and configured to output the swing value to the N1 controller and the N2 controller,
the N1 controller is configured to generate a drive current based upon the swing value, and the N2 controller is configured to generate a drive current based upon the swing value.

7. The wireline transmitter of claim 5,
wherein the wireline transmitter is one of a Universal Serial Bus (USB) transmitter, High-Definition Multimedia Interface (HDMI) transmitter, a Digital Visual Interface (DVI) transmitter and any other transmitter implementing a standard which may use FFE (feed forward equalization).

8. The wireline transmitter of claim 5, wherein
the de-emphasis controller applies de-emphasis to a signal transmitted on the wireline when current based feed-forward emphasis is used.

9. A method for programming a de-emphasis (DE) controller, comprising:
receiving a plurality of control DE levels;
calculating an achieved DE value of each of a N1 and N2 value pair, wherein N1 has a value ranging from zero to N1max and N2 has a value ranging from zero to N2max, wherein N1max is a number of unit cells in a delayed line driver and N2max is a number of unit cells in a non-delayed line driver;
for each of plurality of control DE levels, searching a calculated achieved DE values to select the calculated achieved DE value closest to each of the plurality of control DE levels;
generating a control table, wherein the control table includes for each control DE level an associated N1 value and N2 value based upon the selected calculated achieved DE value closest to the control DE level.

10. The method of claim 9, wherein the table further includes a bias control value based base upon N1+N2 for said each control DE level.

11. The method of claim 9, further comprising loading the table into a DE controller.

12. The method of claim 9, further comprising before generating a control table:
calculating DE error for each of the plurality of control DE levels based upon its associated selected calculated achieved DE value;
determining if any of the calculated DE errors exceeds an DE error threshold;
when the DE error threshold is exceeded, increasing the values of N1max and N2max by a predetermine value;
calculating the achieved DE value of each of the N1 and N2 value pairs, wherein N1 has the value ranging from zero to N1max and N2 has the value ranging from zero to N2max; and
for each of the plurality of control DE levels, searching the calculated achieved DE values to select the calculated achieved DE value closest to each of the plurality of control DE levels.

* * * * *